United States Patent
Maeda

(10) Patent No.: US 8,064,521 B2
(45) Date of Patent: Nov. 22, 2011

(54) MOTION IMAGE CODING APPARATUS, AND CONTROL METHOD AND PROGRAM OF THE APPARATUS

(75) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1552 days.

(21) Appl. No.: 10/579,629

(22) PCT Filed: Dec. 8, 2004

(86) PCT No.: PCT/JP2004/018666
§ 371 (c)(1),
(2), (4) Date: May 17, 2006

(87) PCT Pub. No.: WO2005/062624
PCT Pub. Date: Jul. 7, 2005

(65) Prior Publication Data
US 2007/0098073 A1 May 3, 2007

(30) Foreign Application Priority Data
Dec. 22, 2003 (JP) ................... 2003-425826

(51) Int. Cl.
*H04N 7/12* (2006.01)
(52) U.S. Cl. .................. 375/240.16; 375/240.06
(58) Field of Classification Search ............. 375/240.16, 375/240.06
See application file for complete search history.

(56) References Cited

U.S. PATENT DOCUMENTS

| | | | |
|---|---|---|---|
| 5,912,565 A * | 6/1999 | Mun et al. .............. 327/20 |
| 6,052,417 A | 4/2000 | Fujiwara et al. ............. 375/240 |
| 6,381,275 B1 * | 4/2002 | Fukuhara et al. ........ 375/240.06 |
| 6,501,796 B1 | 12/2002 | Dusseux et al. ......... 375/240.12 |
| 6,950,465 B1 | 9/2005 | Yokoyama et al. ...... 375/240.12 |
| 2004/0233995 A1 | 11/2004 | Abe et al. ................. 375/240.24 |
| 2006/0013304 A1 | 1/2006 | Maeda et al. ............ 375/240.11 |
| 2007/0110158 A1 | 5/2007 | Maeda .................... 375/240.16 |
| 2007/0160299 A1 | 7/2007 | Kajiwara et al. ............. 382/240 |

FOREIGN PATENT DOCUMENTS

| | | |
|---|---|---|
| EP | 0 652 678 A2 | 5/1995 |
| EP | 0 865 208 A2 | 9/1998 |

(Continued)

OTHER PUBLICATIONS

T. Wiegand et al., "Overview of the H.264/AVC Video Coding Standard", IEEE Transactions on Circuits and Systems for Video Technology, vol. 13, No. 7, pp. 560-576, Jul. 2003.

(Continued)

*Primary Examiner* — David Czekaj
*Assistant Examiner* — Anner Holder
(74) *Attorney, Agent, or Firm* — Fitzpatrick, Cella, Harper & Scinto

(57) ABSTRACT

A motion detector detects the motion of an imaging device. On the basis of the detected motion information, a selector selects, from a plurality of frame memories for storing a plurality of frame data, a frame memory for storing reference frame data to be referred to when frame data to be coded is coded. A motion estimator estimates a motion vector on the basis of the reference frame data stored in the selected frame memory and the frame data to be coded. The frame data to be coded is coded by using the estimated motion vector, and the coded data is output.

8 Claims, 13 Drawing Sheets

FOREIGN PATENT DOCUMENTS

| | | |
|---|---|---|
| EP | 1 202 287 A2 | 5/2002 |
| EP | 1 241 893 A2 | 9/2002 |
| JP | 10-136374 A | 5/1998 |
| JP | 10-304374 A | 11/1998 |
| JP | 2000-287173 A | 10/2000 |
| JP | 2000-333179 A | 11/2000 |
| JP | 2001-86510 | 3/2001 |
| JP | 2002-330443 | 11/2002 |
| JP | 2004-221744 | 8/2004 |
| JP | 2004-222213 | 8/2004 |
| RU | 2 209 527 C2 | 7/2003 |
| WO | WO 03/065733 A1 | 8/2003 |

OTHER PUBLICATIONS

Steinbach, et al. "Using Multiple Global Motion Models for Improved Block-Based Video Coding," ICIP '99, Kobe, Japan, vol. 1, pp. 56-60, Oct. 1999.

* cited by examiner

F I G. 13
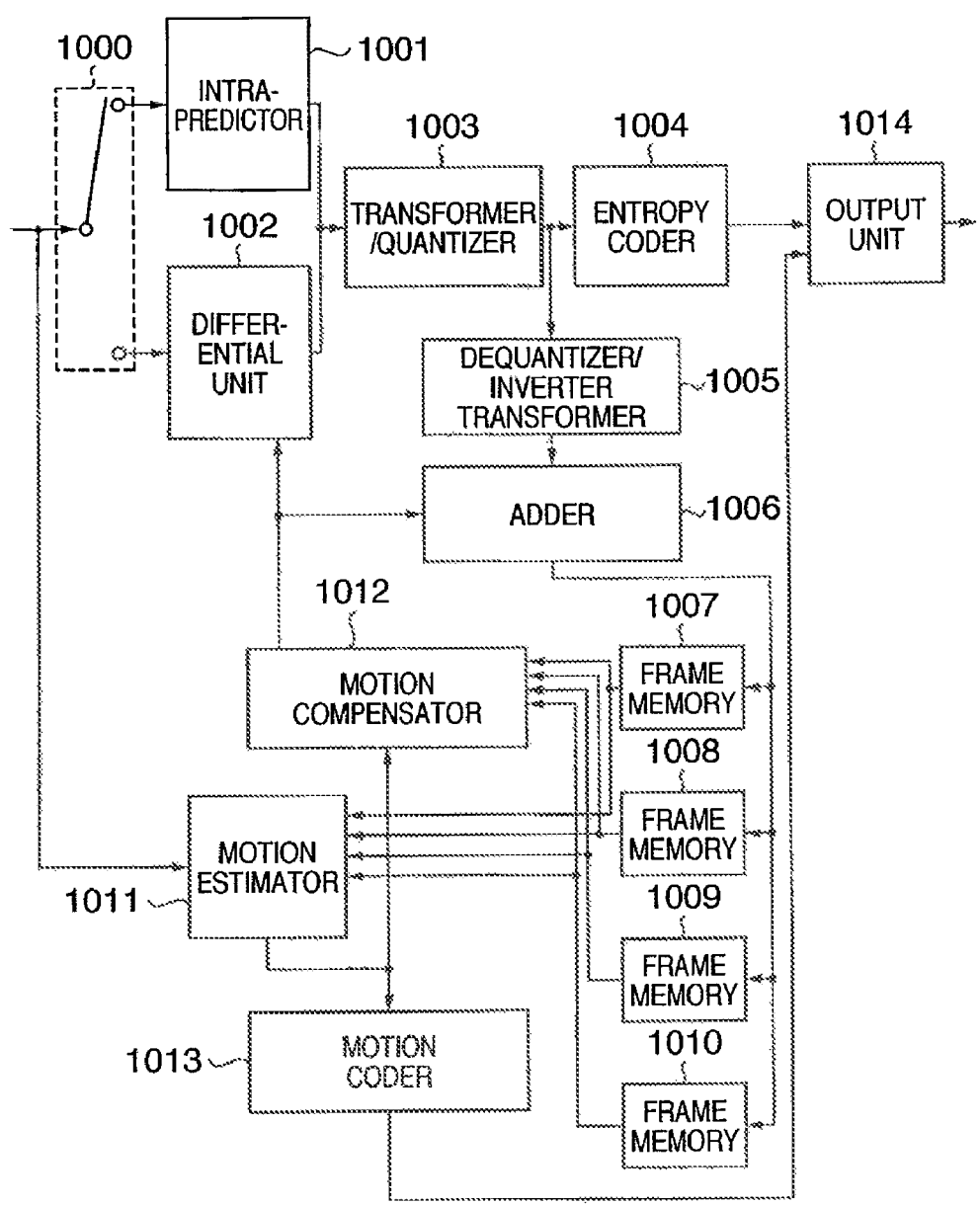
PRIOR ART

MOTION IMAGE CODING APPARATUS, AND CONTROL METHOD AND PROGRAM OF THE APPARATUS

This application is a National Stage Filing Under 35 U.S.C. §371 of International Application No. PCT/JP2004/018666, filed Dec. 8, 2004, and published in English as International Publication No. WO 2005/062624 on Jul. 7, 2005, which claims priority to Japanese Patent Application No. 2003-425826, filed Dec. 22, 2003, hereby incorporated by reference.

TECHNICAL FIELD

The present invention relates to a motion image coding apparatus which codes a motion image by executing motion compensation for frame data to be coded by referring to a plurality of frame data in the motion image, and a control method and program of the apparatus.

BACKGROUND ART

Recently, the H.264 coding method is attracting attention as a new motion image coding method. This coding method is developed by the cooperation of ITU-T and ISO. This new standard was standardized in the summer of 2003.

The characteristic features of this new coding method are that 4×4 integer transformation is used, and a plurality of intra-predictions are prepared, unlike in the conventional MPEG-1, MPEG-2, and MPEG-4 coding methods. In addition, an intra-loop filter is used, and motion compensation is performed by seven types of sub-blocks. Also, the pixel accuracy of the motion compensation is the same as the MPEG-4 coding method, i.e., the motion compensation can be performed by ¼ pixel accuracy. Furthermore, universal variable-length coding or context adaptive variable-length coding is used as entropy coding.

The more important characteristic feature is as follows. That is, the MPEG-1, MPEG-2, and MPEG-4 coding methods perform motion compensation by using two reference images (frames) before and after a frame to be coded. However, this new coding method can use a larger number of reference images. A num_ref_frames code contained in the header of a bit stream can take a maximum of 16 values.

More specifically, in motion compensation, 16 frames before and after a frame to be coded can be referred to as reference images. A macroblock to be coded is processed as follows. As described above, a prediction error is calculated by ¼ pixel accuracy for seven types of sub-blocks with respect to an image having a maximum of 16 frames, and a macroblock by which this prediction error is a minimum is selected. This largely increases the coding efficiency.

The arrangement of the conventional motion image coding apparatus using the H.264 coding method will be explained with reference to FIG. 13. This arrangement is also explained in reference 1 ("Overview of the H.264/AVC Video Coding Standard" (IEEE TRANSACTIONS ON CIRCUITS AND SYSTEMS FOR VIDEO TECHNOLOGY, JULY 2003)).

FIG. 13 is a block diagram showing the arrangement of the conventional motion image coding apparatus.

Image data is input macroblock by macroblock to this motion image coding apparatus. A selector 1000 switches whether to perform intra-coding. If intra-coding is to be performed, the image data is input to an intra-predictor 1001. The intra-predictor 1001 performs prediction in nine modes, and calculates a prediction error.

If coding to be performed is not intra-coding, the image data is input to a differential unit 1002 where the difference from a predicted image is calculated as a prediction error.

A transformer/quantizer 1003 transforms the calculated prediction error into an integer of 4×4 pixel blocks, and quantizes the obtained coefficient. This quantized efficient as the result of quantization undergoes variable-length coding performed by an entropy coder 1004, and is output to an output unit 1014. At the same time, the quantization result is input to a dequantizer/invert transformer 1005 to restore the prediction error, and this prediction error is added to the predicted image by an adder 1006. The result is suitably stored as a decoded image in frame memories 1007 to 1010.

A motion estimator 1011 compares the decoded image stored in the frame memories 1007 to 1010 with the input image, and calculates a motion vector by ¼ pixel accuracy for each sub-block. These motion vectors and the selected frame numbers are input to a motion compensator 1012, and reference images are loaded from the corresponding frame memories. A reference image having a minimum prediction error is selected and output as a predicted image to the differential unit 1002.

The motion vectors and selected frame numbers are also input to a motion coder 1013 and coded, and the coded data is output to the output unit 1014. The output unit 1014 shapes this coded data in accordance with a format, and outputs the shaped data.

Unfortunately, a coding method which refers to a plurality of frames such as the H.264 coding method described above poses the problem that motion vectors are searched for in order to execute motion compensation, and the calculation amount becomes enormous as the number of reference images increases.

In addition, especially when the H.264 coding method is used in an image sensing apparatus such as a video camera, the entire image largely changes whenever the video camera is panned or tilted. Therefore, although the frequency of reference of data of temporally separated frame images decreases, this data must be held.

DISCLOSURE OF INVENTION

The present invention has been made in consideration of the above situation, and has as its object to provide a motion image coding apparatus capable of efficiently using a memory used for motion image coding, and capable of performing efficient motion vector search, and a control method and program of the apparatus.

According to the present invention, the foregoing object is attained by providing a motion image coding apparatus which codes a motion image by executing motion compensation for frame data to be coded by referring to a plurality of frame data in the motion image, comprising: detecting means for detecting a motion of an imaging device; a plurality of storage means for storing the plurality of frame data; selecting means for selecting, from the plurality of storage means, on the basis of motion information detected by the detecting means, storage means for storing reference frame data to be referred to when the frame data to be coded is coded; estimating means for estimating a motion vector on the basis of the reference frame data stored in the storage means selected by the selecting means and the frame data to be coded; coding means for coding the frame data to be coded by using the motion vector estimated by the estimating means; and output means for outputting the coded data which is coded by the coding means.

In a preferred embodiment, the detecting means detects the motion of the imaging device on the basis of a motion image sensed by the imaging device.

In a preferred embodiment, wherein the selecting means comprises control means for controlling write/read and power supply to the plurality of storage means on the basis of the motion information detected by the detecting means.

In a preferred embodiment, further comprises setting means for setting an image sensing mode of the imaging device, wherein the selecting means comprises control means for controlling write/read and power supply to the plurality of storage means on the basis of the image sensing mode set by the setting means.

In a preferred embodiment, the control means stops power supply to storage means not selected by the selecting means.

In a preferred embodiment, the apparatus further comprises search range control means for controlling a motion vector search range of the estimating means on the basis of the motion image detected by the detecting means.

According to the present invention, the foregoing object is attained by providing a motion image coding apparatus which codes a motion image by executing motion compensation for frame data to be coded by referring to a plurality of frame data in the motion image, comprising: setting means for setting an image sensing mode of an imaging device; a plurality of storage means for storing the plurality of frame data; selecting means for selecting, from the plurality of storage means, on the basis of the image sensing mode set by the setting means, storage means for storing reference frame data to be referred to when the frame data to be coded is coded; estimating means for estimating a motion vector on the basis of the reference frame data stored in the storage means selected by the selecting means and the frame data to be coded; coding means for coding the frame data to be coded by using the motion vector estimated by the estimating means; and output means for outputting the coded data which is coded by the coding means.

In a preferred embodiment, the selecting means comprises control means for controlling write/read and power supply to the plurality of storage means.

In a preferred embodiment, the control means stops power supply to storage means not selected by the selecting means.

In a preferred embodiment, the detecting means detects a motion of the imaging device on the basis of a motion image sensed by the imaging device.

According to the present invention, the foregoing object is attained by providing a motion image coding apparatus which codes a motion image by executing motion compensation for frame data to be coded by referring to a plurality of frame data in the motion image, comprising: input means for inputting control information which controls an imaging device; storage means for storing a motion image sensed by the imaging device; setting means for setting the number of reference frame data to be referred to when the frame data to be coded is coded, on the basis of motion information of the imaging device, which is acquired on the basis of the control information input by the input means; acquiring means for acquiring reference frame data corresponding to the number of reference frame data set by the setting means; estimating means for estimating a motion vector on the basis of the reference frame data acquired by the acquiring means and the frame data to be coded; coding means for coding the frame data to be coded by using the motion vector estimated by the estimating means; and output means for outputting the coded data which is coded by the coding means.

In a preferred embodiment, the apparatus further comprises search range control means for controlling a motion vector search range of the estimating means on the basis of the motion information.

According to the present invention, the foregoing object is attained by providing a control method of a motion image coding apparatus which comprises a plurality of storage units for storing a plurality of frame data in a motion image, and codes the motion image by executing motion compensation for frame data to be coded by referring to frame data stored in the plurality of storage units, comprising: a detection step of detecting a motion of an imaging device; a selection step of selecting, from the plurality of storage units, on the basis of motion information detected in the detection step, a storage unit for storing reference frame data to be referred to when the frame data to be coded is coded; an estimation step of estimating a motion vector on the basis of the reference frame data stored in the storage unit selected in the selection step and the frame data to be coded; a coding step of coding the frame data to be coded by using the motion vector estimated in the estimation step; and an output step of outputting the coded data which is coded in the coding step.

According to the present invention, the foregoing object is attained by providing a control method of a motion image coding apparatus which comprises a plurality of storage units for storing a plurality of frame data in a motion image, and codes a motion image by executing motion compensation for frame data to be coded by referring to frame data stored in the plurality of storage units, comprising: a setting step of setting an image sensing mode of an imaging device; a selection step of selecting, from the plurality of storage units, on the basis of the image sensing mode set in the setting step, a storage unit for storing reference frame data to be referred to when the frame data to be coded is coded; an estimation step of estimating a motion vector on the basis of the reference frame data stored in the storage unit selected in the selection step and the frame data to be coded; a coding step of coding the frame data to be coded by using the motion vector estimated in the estimation step; and an output step of outputting the coded data which is coded in the coding step.

According to the present invention, the foregoing object is attained by providing a control method of a motion image coding apparatus which comprises a storage unit for storing a motion image, and codes the motion image by executing motion compensation for frame data to be coded by referring to frame data stored in the storage unit, comprising: an input step of inputting control information which controls an imaging device; a setting step of setting the number of reference frame data to be referred to when the frame data to be coded is coded, on the basis of motion information of the imaging device, which is acquired on the basis of the control information input in the input step; an acquisition step of acquiring reference frame data corresponding to the number of reference frame data set in the setting step; an estimation step of estimating a motion vector on the basis of the reference frame data acquired in the acquisition step and the frame data to be coded, a coding step of coding the frame data to be coded by using the motion vector estimated in the estimation step; and an output step of outputting the coded data which is coded in the coding step.

According to the present invention, the foregoing object is attained by providing a program for implementing control of a motion image coding apparatus which comprises a plurality of storage units for storing a plurality of frame data in a motion image, and codes the motion image by executing motion compensation for frame data to be coded by referring to frame data stored in the plurality of storage units, comprising program codes of: a detection step of detecting a motion of an imaging device; a selection step of selecting, from the plurality of storage units, on the basis of motion information detected in the detection step, a storage unit for storing reference frame data to be referred to when the frame data to be coded is coded; an estimation step of estimating a motion vector on the basis of the reference frame data stored in the storage unit selected in the selection step and the frame data to be coded; a coding step of coding the frame data to be coded by using the motion vector estimated in the estimation step; and an output step of outputting the coded data which is coded in the coding step.

According to the present invention, the foregoing object is attained by providing a program for implementing control of a motion image coding apparatus which comprises a plurality of storage units for storing a plurality of frame data in a motion image, and codes a motion image by executing motion compensation for frame data to be coded by referring to frame data stored in the plurality of storage units, comprising program codes of: a program code of a setting step of setting an image sensing mode of an imaging device; a program code of a selection step of selecting, from the plurality of storage units, on the basis of the image sensing mode set in the setting step, a storage unit for storing reference frame data to be referred to when the frame data to be coded is coded; an estimation step of estimating a motion vector on the basis of the reference frame data stored in the storage unit selected in the selection step and the frame data to be coded; a coding step of coding the frame data to be coded by using the motion vector estimated in the estimation step; and an output step of outputting the coded data which is coded in the coding step.

According to the present invention, the foregoing object is attained by providing a program for implementing control of a motion image coding apparatus which comprises a storage unit for storing a motion image, and codes the motion image by executing motion compensation for frame data to be coded by referring to frame data stored in the storage unit, comprising program codes of: an input step of inputting control information which controls an imaging device; a setting step of setting the number of reference frame data to be referred to when the frame data to be coded is coded, on the basis of motion information of the imaging device, which is acquired on the basis of the control information input in the input step; an acquisition step of acquiring reference frame data corresponding to the number of reference frame data set in the setting step; an estimation step of estimating a motion vector on the basis of the reference frame data acquired in the acquisition step and the frame data to be coded; a coding step of coding the frame data to be coded by using the motion vector estimated in the estimation step; and an output step of outputting the coded data which is coded in the coding step.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 13 is a block diagram showing the arrangement of the conventional motion image coding apparatus.

BEST MODE FOR CARRYING OUT THE INVENTION

Preferred embodiments of the present invention will be described in detail in accordance with the accompanying drawings.

First Embodiment

Figure 1:
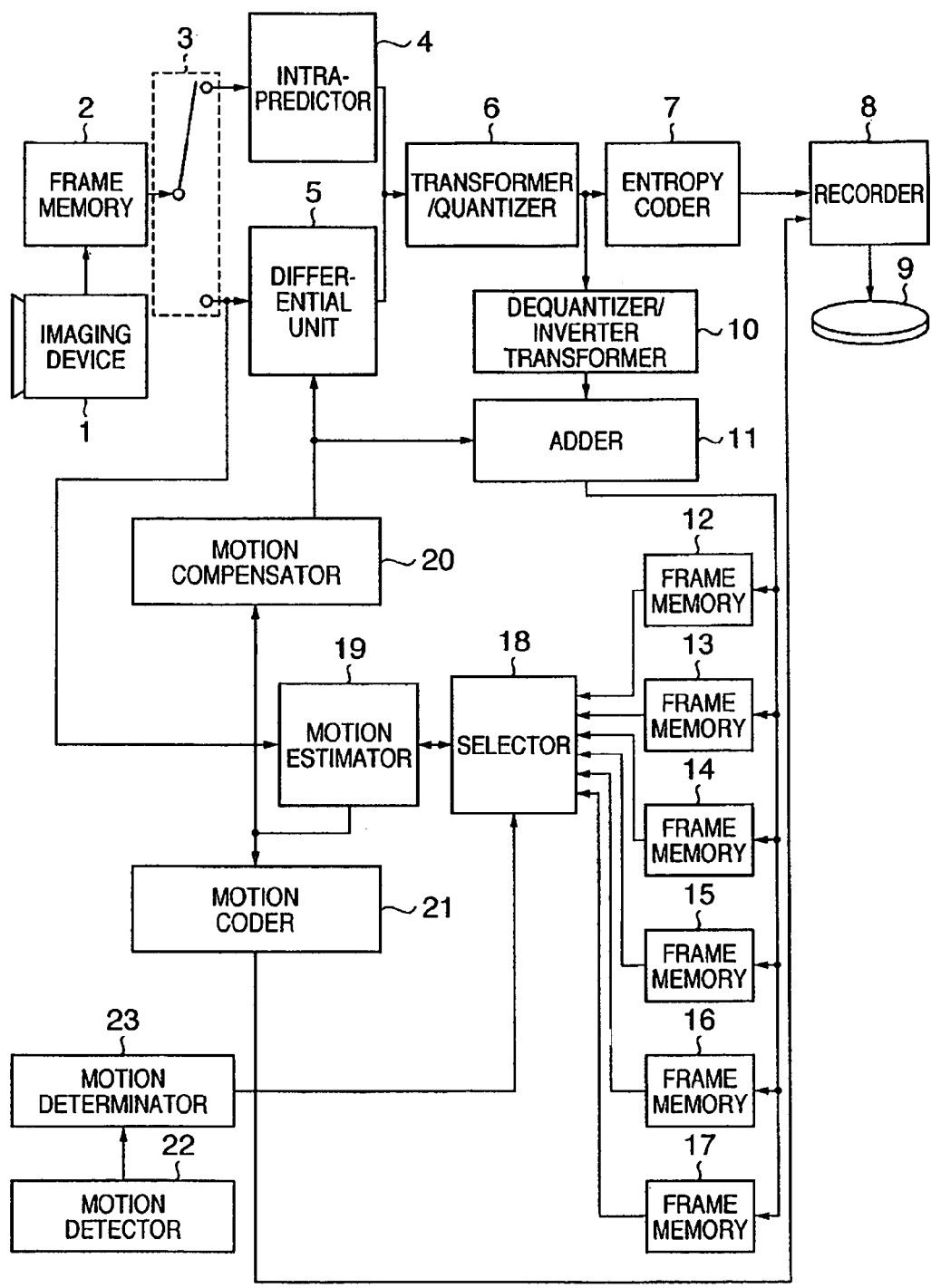
FIG. 1 is a block diagram showing the arrangement of a motion image coding apparatus according to the first embodiment of the present invention.

FIG. 1 is a block diagram showing the arrangement of a motion image coding apparatus according to the first embodiment of the present invention.

The first embodiment will be explained below by taking a camcoder as an example of the motion image coding apparatus.

In the first embodiment, a coding method used by the motion image coding apparatus will be explained by taking the H.264 coding method as an example. However, the coding method is not limited to this method. Also, to simplify the explanation, forward prediction by which frames in the past are referred to will be taken as an example. In addition, the maximum number of reference frames is set to 5 in order to simplify the explanation, but this number is not limited to 5.

Referring to FIG. 1, an imaging device 1 generates a digital signal of an image in cooperation with an optical unit made up of lenses and the like. A frame memory 2 stores the digital signal. A selector 3 selects an output from the frame memory 2 in accordance with whether the coding mode is intra-frame coding or inter-frame coding.

An intra-predictor 4 executes intra-prediction by the H.264 coding method. A differential unit 5 calculates a motion prediction error. A transformer/quantizer 6 executes integer type orthogonal transformation, and quantizes the obtained coefficient. A dequantizer/invert transformer 10 dequantizes the quantized coefficient, and executes integer type orthogonal inversion.

An entropy coder 7 codes the quantization result from the transformer/quantizer 6. A recorder 8 records the coded data on a recording medium 9. The recording medium 9 records the coded data. An adder 11 adds the prediction error obtained by the dequantizer/invert transformer 10 and a predicted value (predicted image).

Frame memories 12, 13, 14, 15, 16, and 17 store frames of locally decoded image data. A selector 18 controls inputs and outputs.

A motion estimator 19 extracts an optimum motion vector from the corresponding frame on the basis of the input image and decoded image. A motion compensator 20 generates a predicted image from the motion vector calculated by the motion estimator 19 and the corresponding frame information.

A motion coder 21 codes motion information on the basis of the calculated motion vector and the corresponding frame information. A motion detector 22 detects the motion of the motion image coding apparatus by using a gyro, sensor, or the like. A motion determinator 23 determines the speed of the motion, which is detected by the motion detector 22, of the motion image coding apparatus.

The motion image coding apparatus shown in FIG. 1 further comprises a CPU which controls the entire apparatus, a ROM which stores various control programs for controlling the apparatus, and a RAM which functions as a work area and temporary save area of various data for executing various control operations.

The motion image coding operation of the motion image coding apparatus shown in FIG. 1 will be explained below.

Before coding, the entropy coder 7 generates header information containing, e.g., the number of frames which can be referred to, and records this header information on the recording medium 9 via the recorder 8.

Image data of frames sensed by the imaging device 1 is stored in the frame memory 2, and input to the selector 3. The selecting operation of the selector 3 is so controlled as to execute intra-frame coding at predetermined intervals, and execute inter-frame coding in other periods.

First, the execution of intra-frame coding for the first frame as a start frame will be explained below.

The input frame data is input macroblock by macroblock to the intra-predictor 4, and the intra-predictor 4 executes intra-prediction for each block. The prediction result is input to the transformer/quantizer 6, and the transformer/quantizer 6 executes integer type orthogonal transformation, and quantities the obtained coefficient. This quantized coefficient as the quantization result is input to the entropy coder 7 and dequantizer/invert transformer 10.

The entropy coder 7 entropy-codes the input quantization result, and records the coded data on the recording medium 9 via the recorder 8.

The dequantizer/invert transformer 10 obtains a decoded image from the input quantization result, and inputs this decoded image to the adder 11. Intra-frame coding uses no predicted image. Therefore, the adder 11 adds a predicted value 0, and stores the image in an empty frame memory or in a frame memory storing the oldest image data of reference images recorded in the frame memories. Initially, no image data is stored in the frame memories 12 to 17, so the image is stored in the frame memory 12.

The execution of inter-frame coding for the subsequent second frame will be described below.

The motion detector 22 detects the motion of the motion image coding apparatus itself. For example, the motion detector 22 calculates vertical and horizontal motion vectors MVx and MVy, and defines the square sum of these vectors as the magnitude of the motion of the motion image coding apparatus. The motion determinator 23 determines whether the magnitude of the motion of the motion image coding apparatus is larger than a predetermined value.

If the magnitude of the motion of the motion image coding apparatus is larger than the predetermined value, the motion determinator 23 controls the selector 18 so as to select outputs from the frame memories 12 to 17 such that two temporally newest frames from the frame memories 12 to 17 are used as reference images. If the magnitude of the motion of the motion image coding apparatus is equal to or smaller than the predetermined value, the motion determinator 23 controls the selector 18 so as to select all outputs from the frame memories 12 to 17.

The motion estimator 19 reads out the contents of the selected frame memory, and calculates a motion vector. The motion compensator 20 generates a predicted image, and inputs this image to the differential unit 5. The selector 3 selects the differential unit 5 as an output. The differential unit 5 calculates a prediction error. The calculation result is inputted to the transformer/quantizer 6. Integer type orthogonal transformation is executed and quantized the obtained coefficient at the transformer/quantizer 6. The quantized coefficient as the quantization result is input to the entropy coder 7 and dequantizer/invert transformer 10.

The entropy coder 7 entropy-codes the input quantization result, and records the coded data on the recording medium 9 via the recorder 8. Also, the motion vector calculated by the motion estimator 19 is coded by the motion coder 21, and the coded data is recorded on the recording medium 9 via the recorder 8.

The dequantizer/invert transformer 10 obtains a prediction error from the input quantization result, and inputs the prediction error to the adder 11. The adder 11 adds the predicted image (predicted value) from the motion compensator 20 to the prediction error, and stores the sum in an empty frame memory or in a frame memory storing the oldest image data of reference images recorded in the frame memories.

The process flow of the motion image coding process of the motion image coding apparatus according to the first embodiment will be described below with reference to FIG. 2.

Figure 2:
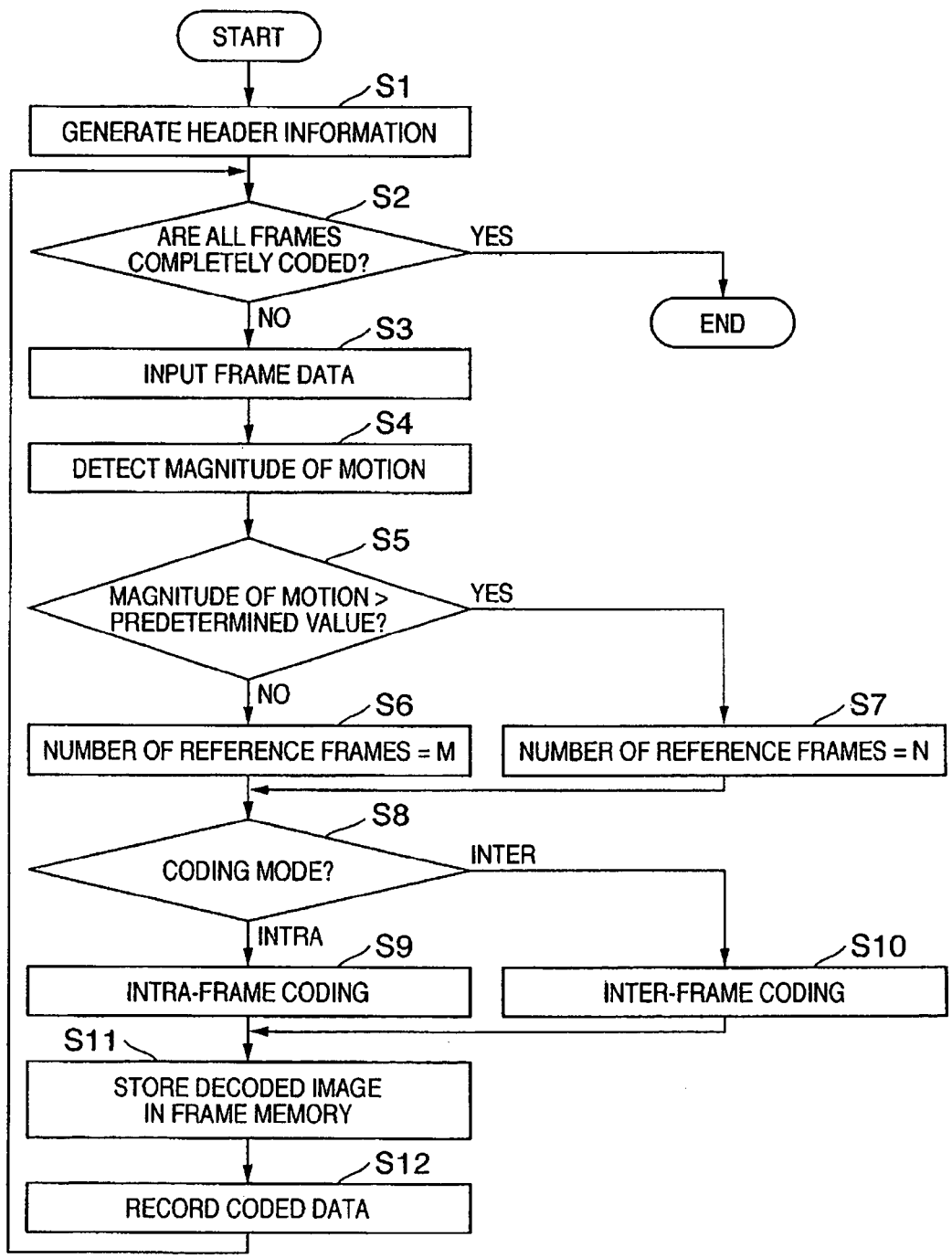
FIG. 2 is a flowchart showing a motion image coding process performed by the motion image coding apparatus according to the first embodiment of the present invention.

FIG. 2 is a flowchart showing the motion image coding process of the motion image coding apparatus according to the first embodiment of the present invention.

First, in step S1, header information is generated and output. In step S2, whether coding of all frames is complete is determined. If coding is complete (YES in step S2), the process is terminated. If coding is not complete (NO in step S2), the flow advances to step S3.

In step S3, frame data to be coded is input. In step S4, the motion of the motion image coding apparatus is detected.

In step S5, the magnitude of the detected motion of the motion image coding apparatus is compared with a predetermined value. If the magnitude of the motion is equal to or smaller than the predetermined value (NO in step S5), the flow advances to step S6 to set the number of reference frames to M (in this case, 5). If the magnitude of the motion is larger than the predetermined value (YES in step S5), the flow advances to step S7 to set the number of reference frames to N (in this case, 2). In this embodiment, M>N always holds.

In step S8, the coding mode of the frame data to be coded is determined.

If the coding mode is intra-frame coding, the flow advances to step S9 to execute intra-frame coding for the input frame data. After that, the flow advances to step S11.

If the coding mode is inter-frame coding, the flow advances to step S10 to execute inter-frame coding by executing motion compensation while images in frame memories equal in number to the reference frames are referred to. After that, the flow advances to step S11.

In step S11, the decoded image is stored in an empty frame memory or in a frame memory storing the temporally oldest image data of the frame memories.

In step S12, the coded data is recorded on the recording medium 9. Then, the flow returns to step S2 to process the next frame.

In the first embodiment as described above, if the motion of the imaging device is large (lively), the frequency of reference of temporally separated frames extremely decreases, so these frames are not referred to. This largely reduces the arithmetic processing amount pertaining to motion compensation. As a consequence, the processing speed can be increased.

In the first embodiment, the maximum number of reference frames is set to 5. However, it is obviously also possible to use any number of reference frames by using a necessary number of frame memories.

Also, in the first embodiment, the number of reference frames when the motion is large is not limited to the above-mentioned number. In addition, the number of frames to be selected may also be variable in accordance with the magnitude of the motion. For example, the number of frames which can be referred to can be determined inversely proportional to the magnitude of the motion of the motion image coding apparatus, or some other standard may also be used.

In the first embodiment, the motion of the imaging device 1 is detected by the motion detector 22 (sensor). However, the motion of the imaging device 1 may also be detected on the basis of input image data. For example, it is also possible to detect a rough motion vector by generating a reduced image, or detect the motions of several points of an image and use the detection results as the motion of the imaging device 1.

The first embodiment is explained by taking only forward prediction as an example. However, backward prediction or bidirectional prediction may also be performed by using a necessary number of frame memories.

It is, of course, also possible to describe, in software, some or all of the various constituent elements of the motion image coding apparatus according to the first embodiment, and execute processing by an arithmetic unit such as a CPU.

Second Embodiment

Figure 3:
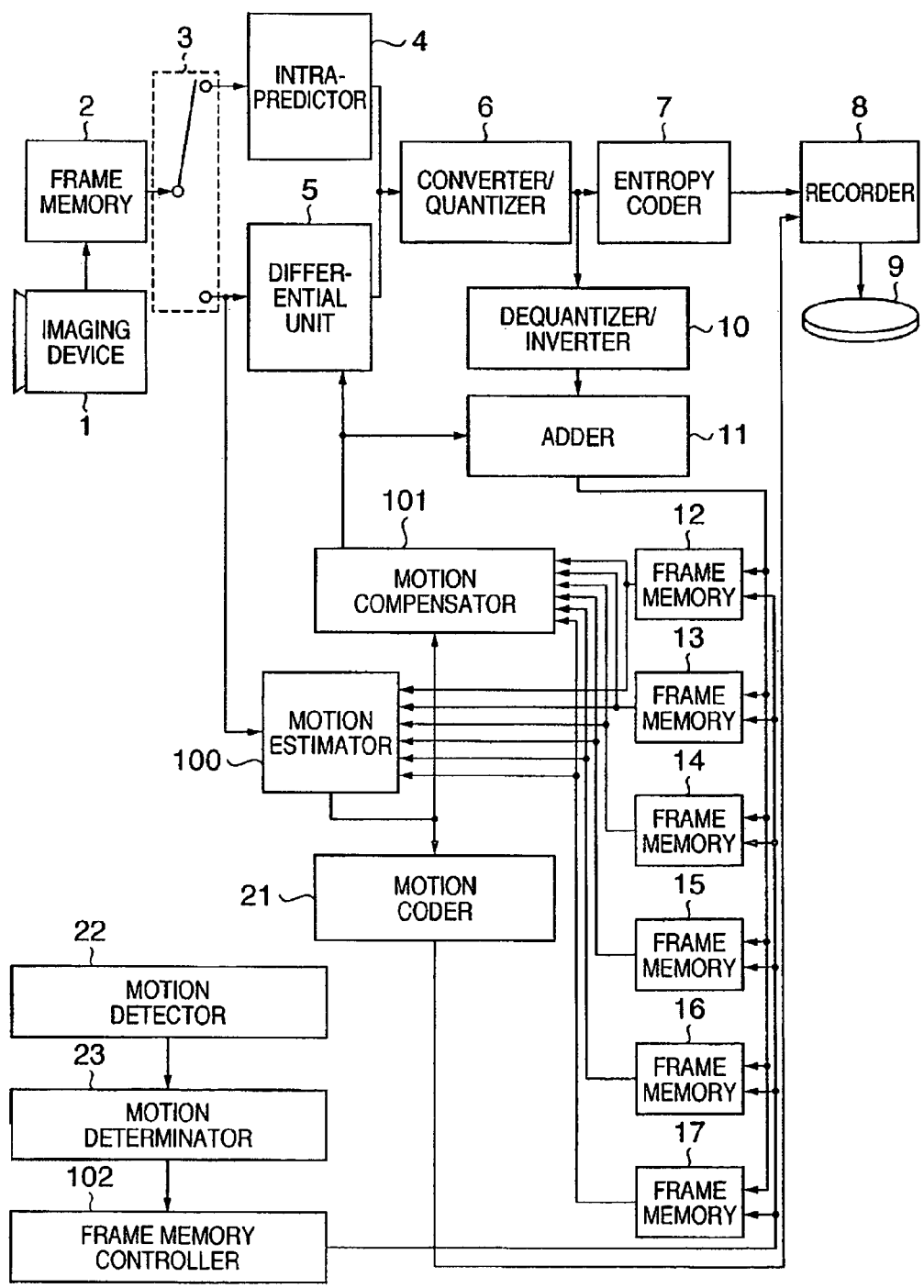
FIG. 3 is a block diagram showing the arrangement of a motion image coding apparatus according to the second embodiment of the present invention.

FIG. 3 is a block diagram showing the arrangement of a motion image coding apparatus according to the second embodiment of the present invention.

The same reference numerals as in FIG. 1 of the first embodiment denote parts having the same functions in FIG. 3, and an explanation thereof will be omitted.

Referring to FIG. 3, a motion estimator 100 refers to an input image and frame data which can be referred to from decoded image data in frame memories 12 to 17, and extracts an optimum motion vector from the corresponding frame data.

A motion compensator 101 generates a predicted image from the motion vector calculated by the motion estimator 100 and the corresponding frame information. A frame memory controller 102 controls the frame memories 12 to 17.

That is, the frame memory controller 102 controls write and read and the supply of power to the frame memories 12 to 17.

The motion image coding operation of the motion image coding apparatus shown in FIG. 3 will be described below.

First, as in the first embodiment, header information is generated and recorded on a recording medium 9 via a recorder 8.

Then, as in the first embodiment, image data of frames sensed by an imaging device 1 are stored in a frame memory 2 and input to a selector 3.

When intra-frame coding is to be executed, processing is entirely the same as in the first embodiment, and the generated coded data is recorded on the recording media 9 via the recorder 8.

In addition, in accordance with instructions from the frame memory controller 102, a decoded image is stored in an empty frame memory or in a frame memory storing the oldest image data of reference images recorded in the frame memories. That is, the frame memory controller 102 supplies power to one of unused frame memories to set it in a writable state, or sets a frame memory having the oldest frame of the frame memories in a writable state.

The execution of inter-frame coding will be explained below.

As in the first embodiment, a motion detector 22 detects the motion of the motion image coding apparatus itself. For example, the motion detector 22 calculates vertical and horizontal motion vectors MVx and MVy, and defines the square sum of these vectors as the magnitude of the motion of the motion image coding apparatus. A motion determinator 23 determines whether the magnitude of the motion of the motion image coding apparatus is larger than a predetermined value.

If the magnitude of the motion of the motion image coding apparatus is larger than the predetermined value, the motion determinator 23 notifies the frame memory controller 102 that the motion image coding apparatus has moved largely. When receiving this notification, the frame memory controller 102 sets two of the frame memories 12 to 17 in a readable state, and sets another frame memory in a writable state, in order to selects outputs from the frame memories 12 to 17 so that the two temporally newest frames are chosen as reference images. In addition, the frame memory controller 102 stops the supply of power to the other frame memories.

If the magnitude of the motion of the motion image coding apparatus is equal to or smaller than the predetermined value, the motion determinator 23 notifies the frame memory controller 102 that the motion image coding apparatus has not largely moved. When receiving this notification, the frame memory controller 102 sets a frame memory storing the frame data in a readable state. Also, the frame memory controller 102 supplies power to one of unused frame memories to set it in a writable state, or sets a frame memory having the oldest frame of the frame memories in a writable state.

The motion estimator 100 reads out the contents of the frame memory set in the readable state, and calculates a motion vector. The motion compensator 101 generates a predicted image, and inputs the image to a differential unit 5. After that, as in the first embodiment, inter-frame coding is performed, and the coded data is recorded on the recording medium 9 via the recorder 8.

A dequantizer/invert transformer 10 obtains a prediction error from the input quantization result, and inputs this prediction error to an adder 11. The adder 11 adds the predicted image from the motion compensator 101 to the prediction error, and stores the addition result in the frame memory set in the writable state.

The process flow of the motion image coding process of the motion image coding apparatus according to the second embodiment will be described below with reference to FIGS. 4 to 6.

Figure 4:
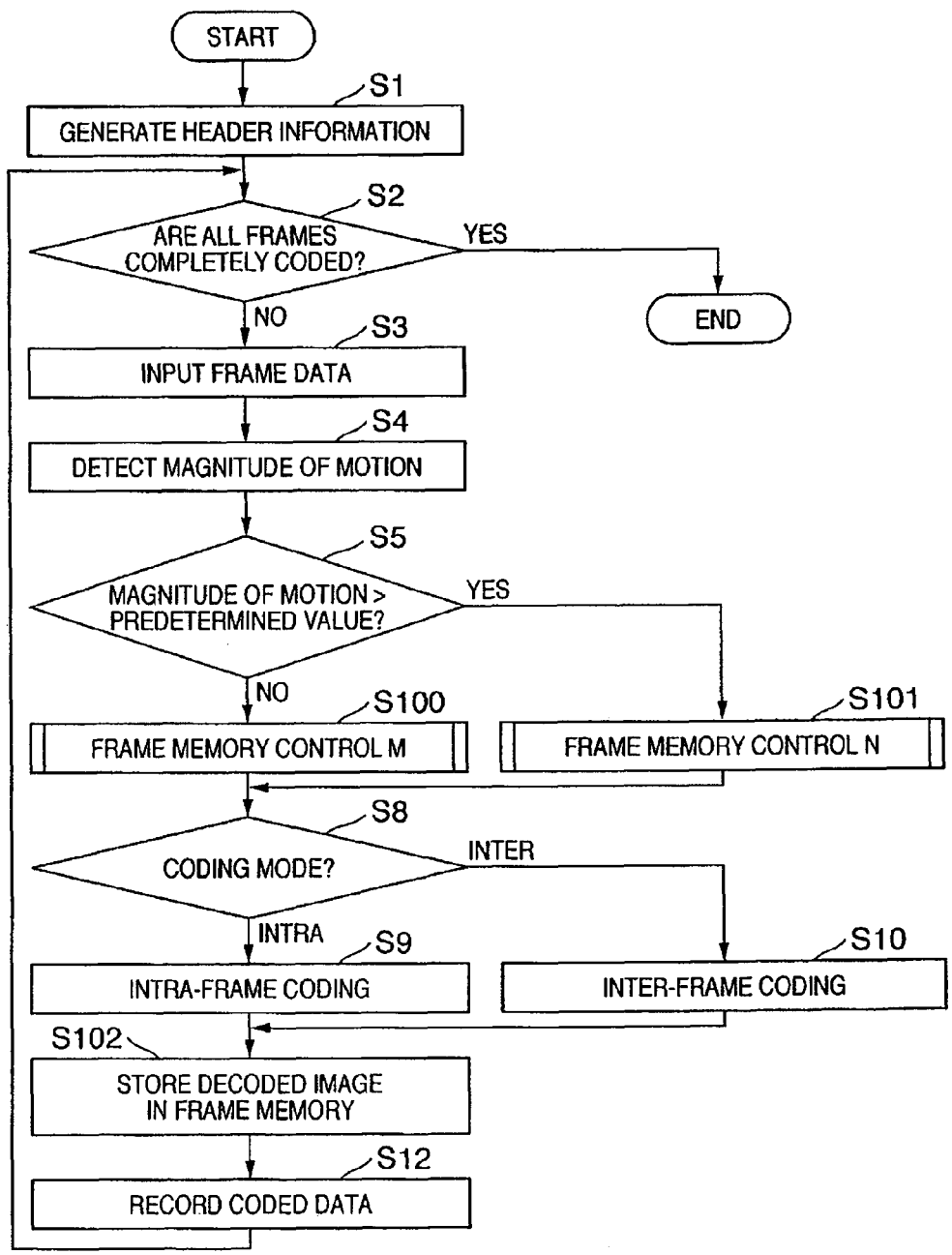
FIG. 4 is a flowchart showing a motion image coding process performed by the motion image coding apparatus according to the second embodiment of the present invention.

FIG. 4 is a flowchart showing the motion image coding process of the motion image coding apparatus according to the second embodiment of the present invention.

The same reference numerals as in FIG. 2 of the first embodiment denote steps having the same functions in FIG. 4, and an explanation thereof will be omitted.

As in the first embodiment, after processes in steps S1 to S4, if the magnitude of the motion is equal to or smaller than the predetermined value in step S5 (NO in step S5), the flow advances to step S100 to execute frame memory control M. If the magnitude of the motion is larger than the predetermined value (YES in step S5), the flow advances to step S101 to execute frame memory control N. In this embodiment, M>N always holds.

Details of frame memory control M in step S100 will be explained below with reference to FIG. 5.

Figure 5:
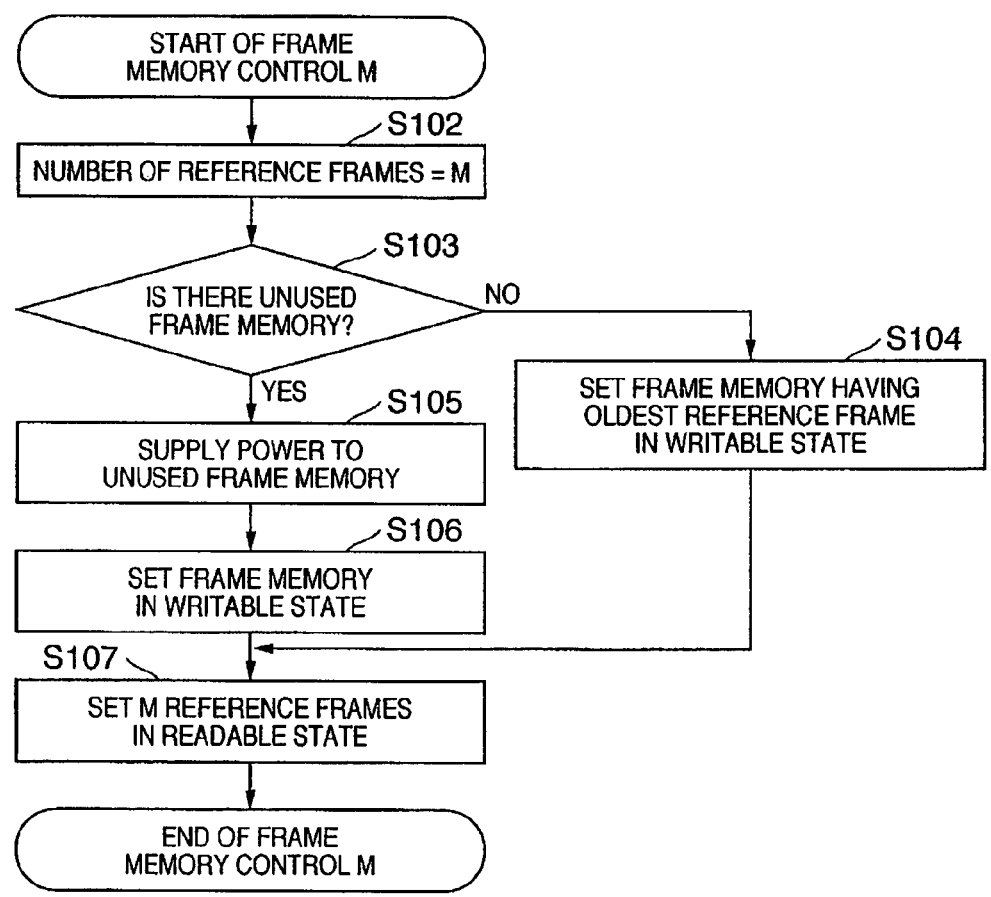
FIG. 5 is a flowchart showing details of frame memory control M according to the second embodiment of the present invention.

FIG. 5 is a flowchart showing the details of frame memory control M according to the second embodiment of the present invention.

In step S102, the number of reference frames is set to M (in this case, 5). In step S103, the presence/absence of unused frame memories which are supplied with no power and kept unused is determined. If there is no unused frame memory (NO in step S103), the flow advances to step S104 to set a frame memory storing the temporally oldest image data (reference frame) in a writable state.

On the other hand, if unused frame memories exist (YES in step S103), the flow advances to step S105 to select one unused frame memory and make it usable by supplying power to it. In step S106, this frame memory made usable in step S105 is set in a writable state.

In step S107, a maximum of M frame memories from the temporally newest one of the remaining frame memories are set in a readable state. In this manner, the sequence of frame memory control M is complete, and the flow advances to step S8 in FIG. 4.

Details of frame memory control N in step S101 will be explained below with reference to FIG. 6.

Figure 6:
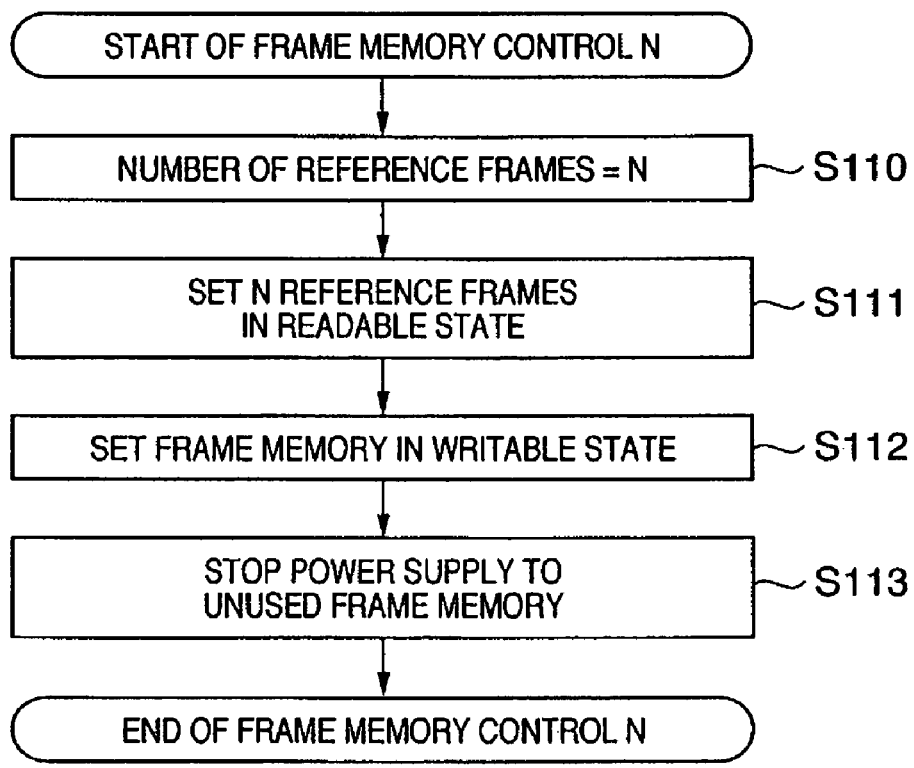
FIG. 6 is a flowchart showing details of frame memory control N according to the second embodiment of the present invention.

FIG. 6 is a flowchart showing the details of frame memory control N according to the second embodiment of the present invention.

In step S110, the number of reference frames is set to N (in this case, 2).

In step S111, N frame memories from the temporally newest one of the remaining frame memories are set in a readable state. In step S112, one of the remaining frame memories is set in a writable state.

In step S113, power supply to the still remaining frame memories is stopped because they are unused frame memories. In this way, the sequence of memory control N is complete, and the flow advances to step S8.

Referring back to FIG. 4, as in the first embodiment, after processes in steps S8 to S10, in step S102 the decoded image is stored in a writable one of the frame memories. In step S12, the coded data is recorded on the recording medium 9, and the flow returns to step S2 to process the next frame.

In the second embodiment as described above, in addition to the effects explained in the first embodiment, the power consumption can be reduced by stopping power-supply to unused frame memories. Therefore, especially in an environment in which the apparatus is operated by a limited power supply, the operation time of the apparatus can be prolonged.

In the second embodiment, the maximum number of reference frames is set to 5. However, it is obviously also possible to use any number of reference frames by using a necessary number of frame memories.

Also, in the second embodiment, the number of reference frames when the motion is large is not limited to the above-mentioned number. In addition, the number of frames to be selected may also be variable in accordance with the magnitude of the motion. For example, the number of frames which can be referred to can be determined inversely proportional to the magnitude of the motion of the motion image coding apparatus, or some other standard may also be used.

The second embodiment is explained by taking only forward prediction as an example. However, backward prediction or bidirectional prediction may also be performed by using a necessary number of frame memories.

It is, of course, also possible to describe, in software, some or all of the various constituent elements of the motion image coding apparatus according to the second embodiment, and execute processing by an arithmetic unit such as a CPU.

Third Embodiment

Figure 7:
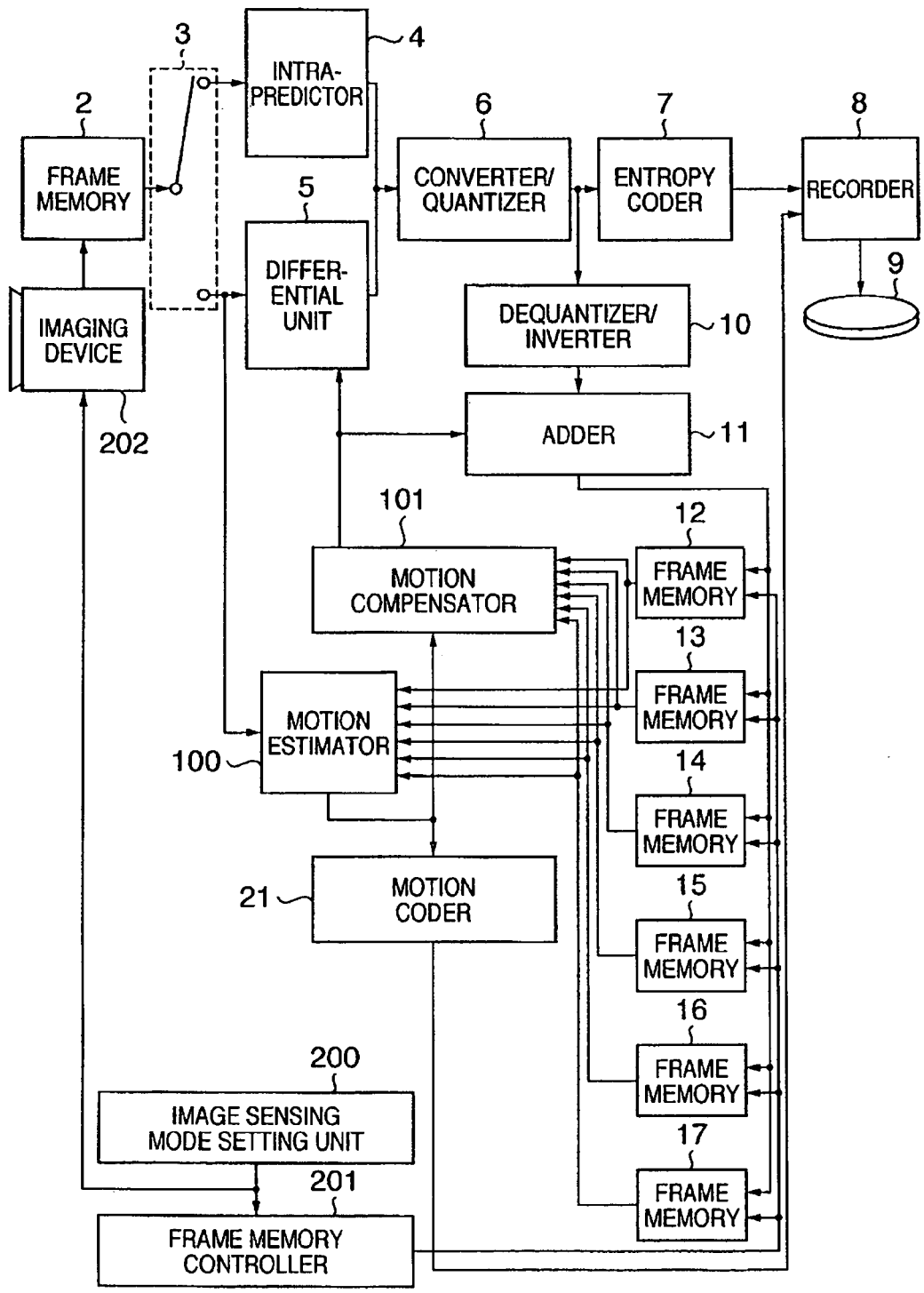
FIG. 7 is a block diagram showing the arrangement of a motion image coding apparatus according to the third embodiment of the present invention.

FIG. 7 is a block diagram showing the arrangement of a motion image coding apparatus according to the third embodiment of the present invention.

The same reference numerals as in FIG. 3 of the second embodiment denote parts having the same functions in FIG. 7, and an explanation thereof will be omitted.

Referring to FIG. 7, an image sensing mode setting unit 200 sets the image sensing mode of the motion image coding apparatus. Examples of the image sensing mode are "automatic mode" as a standard, "sports mode" for sensing an image of an object having a high speed, and "scenery mode" for sensing images of scenes such as mountains, seas, and the like. However, the image sensing modes are not limited to these examples.

A frame memory controller 201 controls frame memories 12 to 17. In accordance with the image sensing mode, the frame memory controller 201 controls write and read and power supply to the frame memories 12 to 17. An imaging device 202 can control the shutter speed, aperture value, and the like in accordance with instructions from the image sensing mode setting unit 200.

The motion image coding operation of the motion image coding apparatus shown in FIG. 7 will be described below.

First, a user (not shown) sets the image sensing mode of the imaging device 202 by using the image sensing mode setting unit 200 before starting image sensing. The set image sensing mode is input to the imaging device 202 and frame memory controller 201. The imaging device 202 selects and sets a shutter speed and F-number suited to the set image sensing mode.

When "automatic mode" is selected, the frame memory controller 201 sets the number of reference frames to 3, and stops power supply to the frame memories 16 and 17 to keep them unused. When "sports mode" is selected, the frame memory controller 201 sets the number of reference frames to 1, and stops power supply to the frame memories 14 to 17 to keep them unused. When "scenery mode" is selected, the frame memory controller 201 sets the number of reference frames to 5.

After that, intra-frame coding or inter-frame coding of each frame is executed by using frame memories to which electric power is supplied.

When intra-frame coding is to be executed, the frame memory controller 201 sets, from the frame memories to which power is supplied, an empty frame memory or a frame memory storing the temporally oldest frame in a writable state in order, and stores the decoded image.

When inter-frame coding is to be executed, the frame memory controller 201 sets, from of the frame memories to which power is supplied, an empty frame memory or a frame memory storing the temporally oldest frame in a writable state in order, and sets the other frame memories in a readable state.

Note that in inter-frame coding, the number of reference frames is set for each image sensing mode. Therefore, in accordance with the number of reference frames, motion vectors are calculated, and motion compensation is executed. The generated coded data is recorded on a recording medium 9 via a recorder 8. The decoded image is stored in the frame memories set in the writable state.

The process flow of the motion image coding process of the motion image coding apparatus according to the third embodiment will be described below with reference to FIG. 8.

Figure 8:
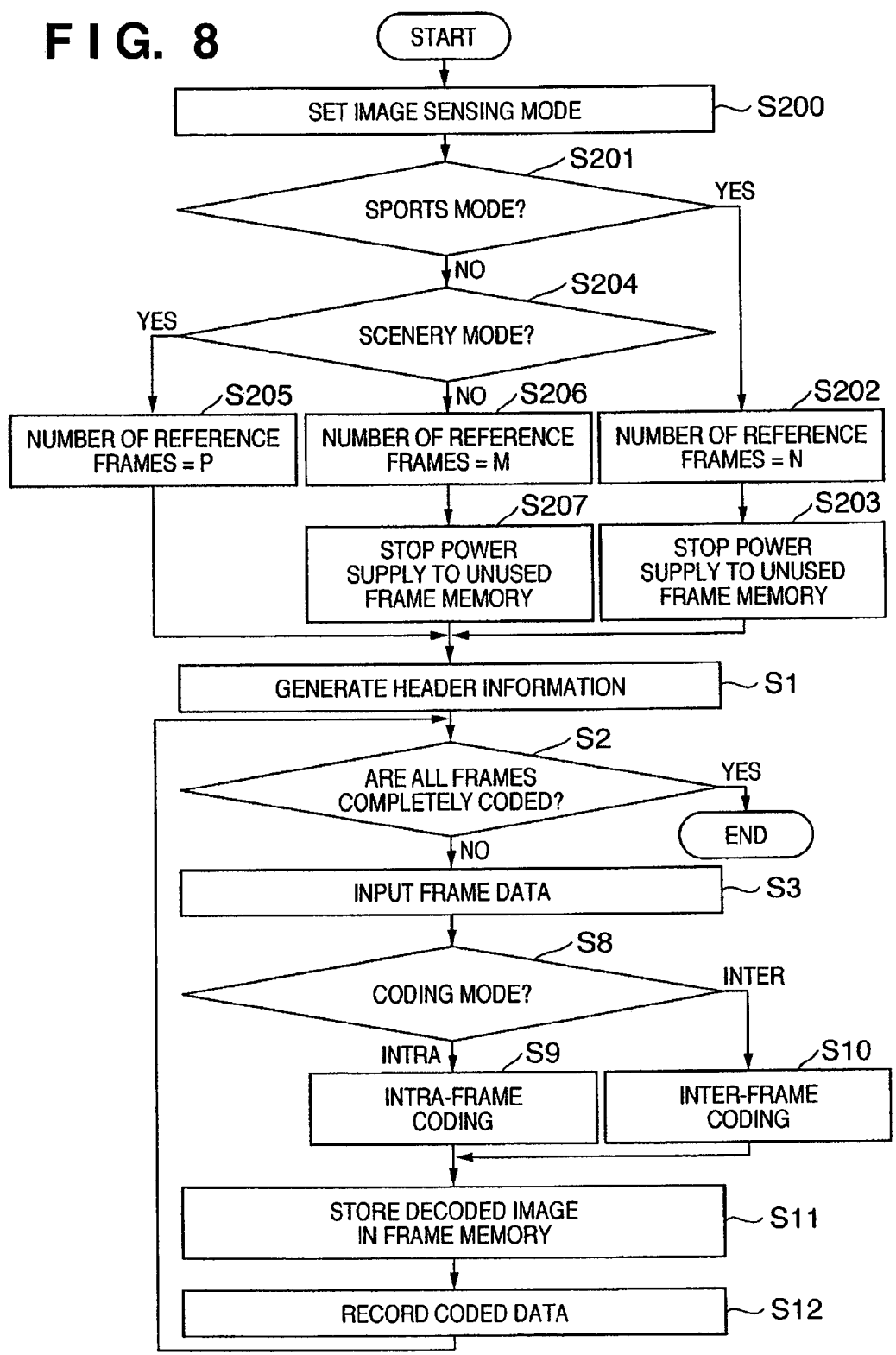
FIG. 8 is a flowchart showing a motion image coding process performed by the motion image coding apparatus according to the third embodiment of the present invention.

FIG. 8 is a flowchart showing the motion image coding process of the motion image coding apparatus according to the third embodiment of the present invention.

The same reference numerals as in FIG. 2 of the first embodiment denote steps having the same functions in FIG. 8, and an explanation thereof will be omitted.

In step S200, the image sensing mode is set.

Assume that in FIG. 8, "sports mode", "scenery mode", and "automatic mode" are the image sensing modes.

In step S201, whether the image sensing mode is "sports mode" is determined. If the image sensing mode is "sports mode" (YES in step S201), the flow advances to step S202 to set the number of reference frames to N (in this case, 1). In step S203, power supply to unused frame memories are stopped. After that, the flow advances to step S1.

If the image sensing mode is not "sports mode" in step S201 (NO in step S201), the flow advances to step S204 to determine whether the image sensing mode is "scenery mode". If the image sensing mode is "scenery mode", the flow advances to step S205 to set the number of reference frames to P (in this case, 5). After that, the flow advances to step S1.

If the image sensing mode is not "scenery mode" (NO in step S204), the flow advances to step S206 to set the number of reference frames to M (in this case, 3). In step S207, power supply to unused frame memories is stopped. The flow then advances to step S1. In this embodiment, $P \geq M \geq N$ always holds.

After that, as in the first embodiment, processes in steps S1 to S3 and S8 to S12 are executed on the basis of one of the set numbers of reference frames P, M, and N.

In the third embodiment as described above, the number of reference frames is controlled on the basis of the magnitude, which is expected by the image sensing mode, of the motion of a motion image to be coded. As a consequence, optimum processing can be executed in accordance with the motion.

Also, since the number of reference frames is preset on the basis of the image sensing mode, optimum reference can be performed. In addition, the power consumption can be reduced by stopping power supply to unused frame memories. Therefore, especially in an environment in which the apparatus is operated by a limited power supply, the operation time of the apparatus can be prolonged.

In the third embodiment, the maximum number of reference frames is set to 5. However, it is obviously also possible to use any number of reference frames by using a necessary number of frame memories.

Also, the third embodiment is explained by taking only forward prediction as an example. However, backward prediction or bidirectional prediction may also be performed by using a necessary number of frame memories.

It is, of course, also possible to describe, in software, some or all of the various constituent elements of the motion image coding apparatus according to the third embodiment, and execute processing by an arithmetic unit such as a CPU.

Fourth Embodiment

Figure 9:
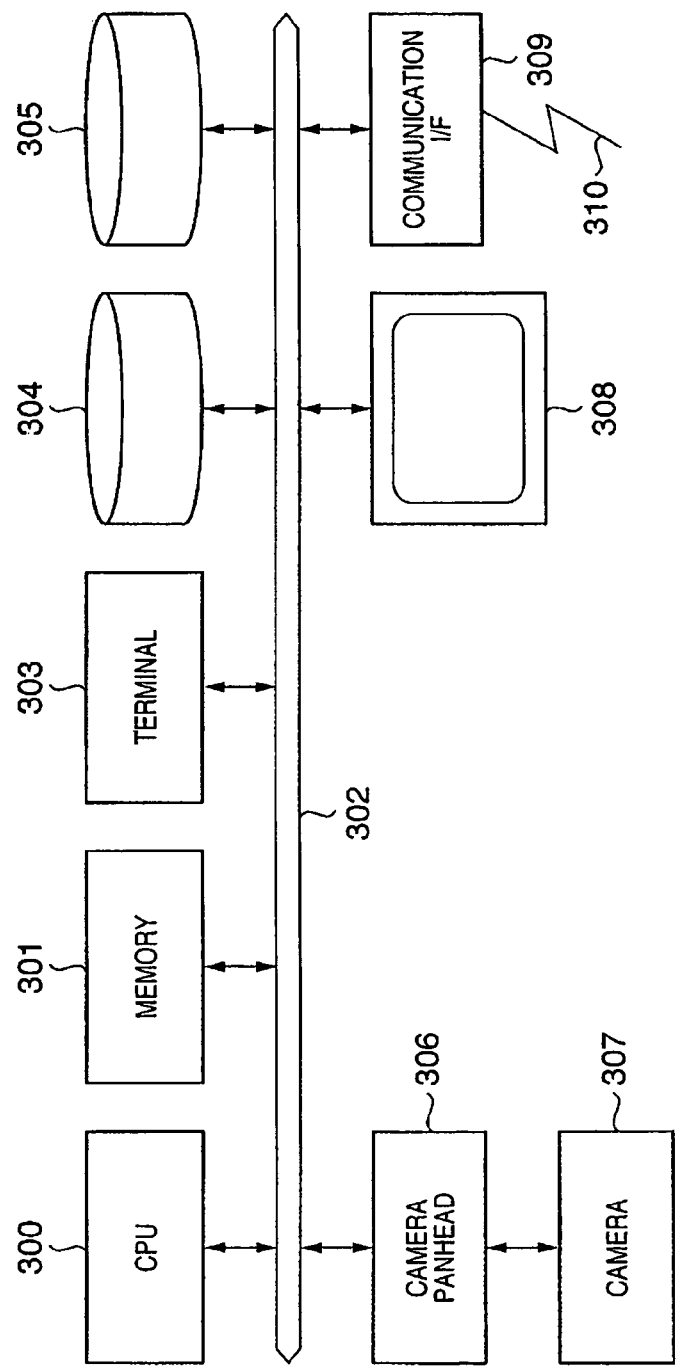
FIG. 9 is a block diagram showing the arrangement of a motion image coding apparatus according to the fourth embodiment of the present invention.

FIG. 9 is a block diagram showing the arrangement of a motion image coding apparatus according to the fourth embodiment of the present invention.

Referring to FIG. 9, a central processing unit (CPU) 300 controls the entire apparatus and performs various processes. A memory 301 provides storage areas for an operating system (OS), software, and arithmetic operations necessary to control this apparatus. A bus 302 interconnects various constituent elements forming the motion image coding apparatus, and transfers data and control signals.

A terminal 303 is used to activate the apparatus, set various conditions, and execute playback instructions. A storage device 304 stores software. A storage device 305 stores coded streams. The storage devices 304 and 305 may also be portable storage media which can be separated from the motion image coding apparatus and moved.

A camera (imaging device) 307 can sense motion images frame by frame. A camera panhead 306 of the camera 307 is controlled by software, and has a function of outputting, to the bus 302, image data from the camera 307, the state of the camera 307, and the state of the camera panhead 306 itself.

A monitor 308 displays images. A communication line 310 is, e.g., a LAN, public line, radio channel, or broadcasting radio wave. A communication interface (I/F) 309 transmits and receives streams via the communication line 310.

The memory 301 stores the OS for controlling the entire apparatus and operating various software, and also stores the software to be operated. In addition, the memory 301 has an image area for storing image data, a code area for storing generated coded data, and a working area for storing, e.g., parameters for various arithmetic operations and coding.

A process which, in the arrangement as described above, controls the camera panhead 306 and the camera 307 from an external terminal via the communication line 310, codes a motion image sensed by the camera 307, and transmits the coded motion image to the external terminal via the communication line 310, will be described below.

In the fourth embodiment, a coding method used by the motion image coding apparatus will be explained by taking the H.264 coding method as an example. However, any coding method can be used as long as an image is coded by referring to two or more frames. Also, to simplify the explanation, three frames before a frame to be coded and three frames after it are referred to. However, the number of reference frames is not limited.

Before the processing, the terminal 303 instructs the whole apparatus to perform activation, thereby initializing the individual constituent elements. Consequently, software stored in the storage device 304 is developed on the memory 301 via the bus 302, and activated.

The data configuration of the memory 301 will be explained below with reference to FIG. 10.

Figure 10:
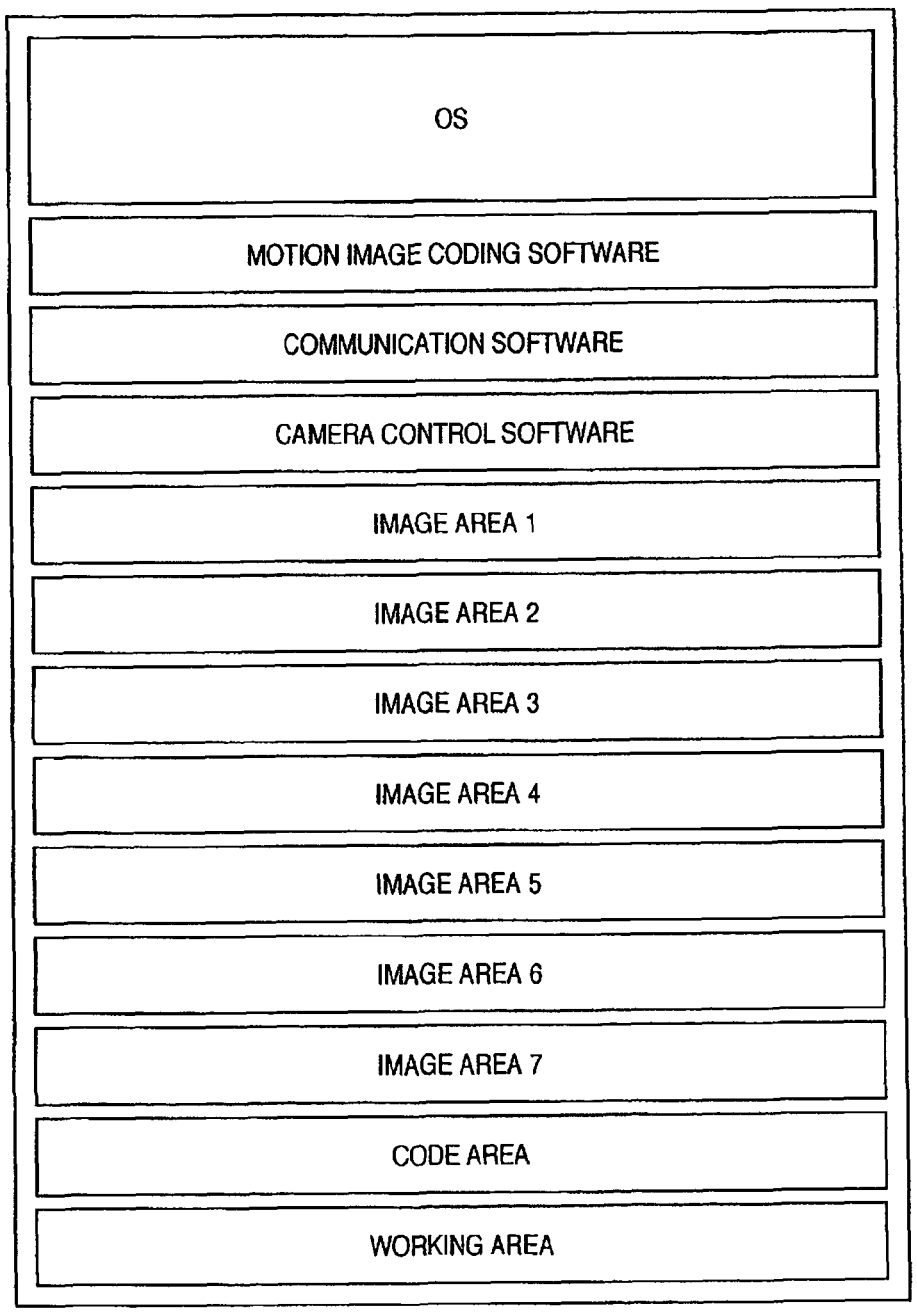
FIG. 10 is a view showing the data configuration of a memory according to the fourth embodiment of the present invention.

FIG. 10 is a view showing the data configuration of the memory according to the fourth embodiment of the present invention.

As shown in FIG. 10, the memory 301 stores the OS for controlling the whole apparatus and operating various software, motion image coding software for executing the H.264 coding method, communication software for controlling communication, and camera control software for controlling the camera panhead 306. The memory 301 also has image areas 1 to 7 for storing image data, a code area for storing coded data, and a working area.

The way the CPU 300 controls the motion image coding apparatus in the arrangement as described above will be explained below with reference to FIG. 11.

Figure 11:
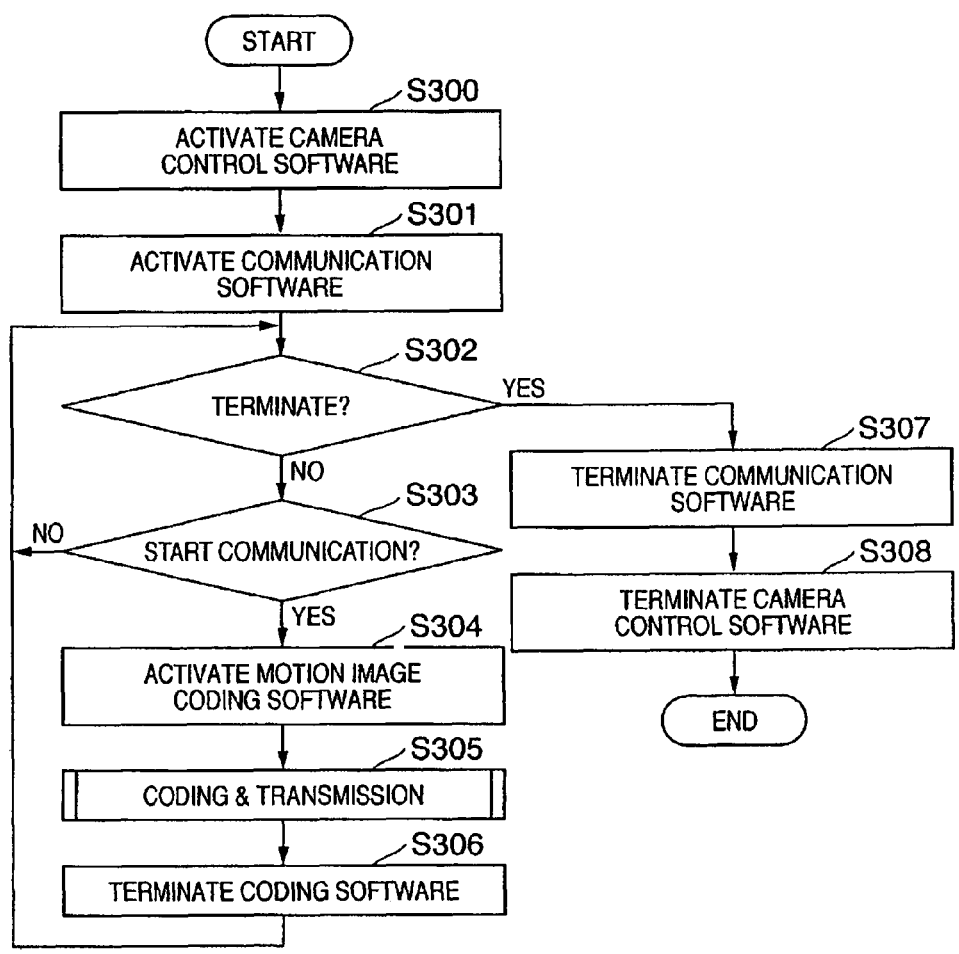
FIG. 11 is a flowchart showing processing executed by the motion image coding apparatus according to the fourth embodiment of the present invention.

FIG. 11 is a flowchart showing processing executed by the motion image coding apparatus according to the fourth embodiment of the present invention.

In step S300, the CPU 300 activates the camera control software to initialize the individual parts, and starts sensing motion images. In step S301, the CPU 300 activates the communication software to receive camera control information via the communication line 310, thereby making preparations for outputting coded data.

In step S302, the CPU 300 determines whether process termination is input from the terminal 303. If termination is input (YES in step S302), the flow advances to step S307, and the CPU 300 terminates the communication software. In step S308, the CPU 300 terminates the camera control software, and then terminates the entire process.

On the other hand, if termination is not input in step S302 (NO in step S302), the flow advances to step S303, and the CPU 300 determines whether a camera control request and motion image transmission request are input from the communication line 310 via the communication interface 309. If no such requests are input (NO in step S303), the flow returns to step S302, and the CPU 300 waits until these requests are input. If these requests are input (YES in step S303), the flow advances to step S304.

In step S304, the CPU 300 activates the motion image coding software. In step S305, the CPU 300 executes coding and transmits the coded data. Details of this process will be described later. When the communication is complete, the flow advances to step S306. In step S306, the CPU 300 terminates the coding software. The flow then returns to step S302, and the CPU 300 waits for the next instruction.

The details of the process in step S305 will be explained below with reference to FIG. 12.

Figure 12:
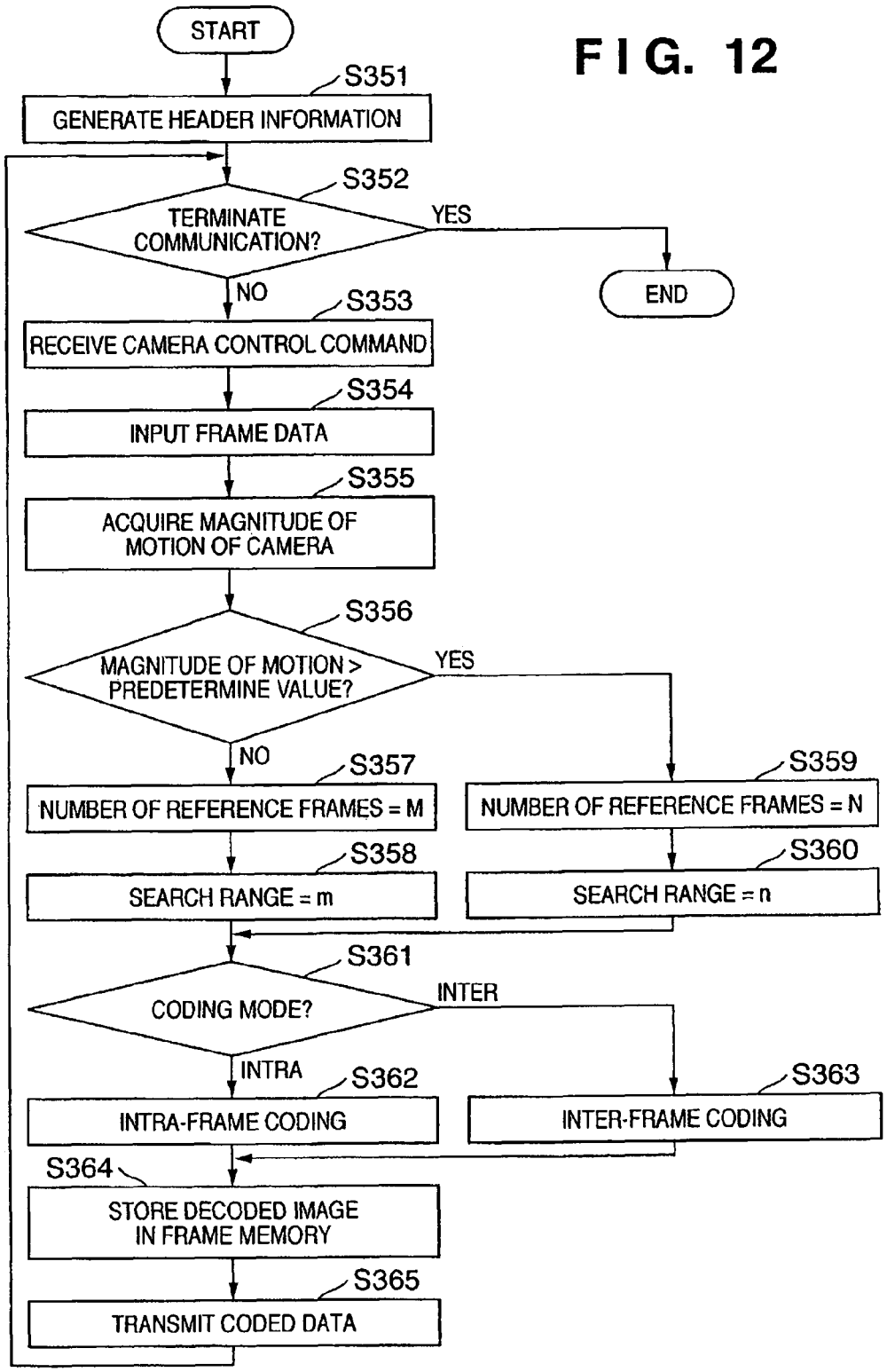
FIG. 12 is a flowchart showing details of processing in step S305 according to the fourth embodiment of the present invention.

FIG. 12 is a flowchart showing the details of the process in step S305 according to the fourth embodiment of the present invention.

First, in step S351, header information is generated and stored in the code area on the memory 301. When the coded data is stored in the code area, the communication software transmits the data to the communication line 310 via the communication interface 309, and, after the transmission, clears the corresponding region of the code area. Transmission of the coded data in the code area will not particularly be described in the following explanation.

In step S352, the CPU 300 determines the presence/absence of a communication termination request. If there is a communication termination request (YES in step S352), the CPU 300 terminates the process. If there is no communication termination request (NO in step S352), the flow advances to step S353.

In step S353, if a camera control command for controlling the camera is received from the communication line 310 via the communication interface 309, the CPU 300 inputs the command to the camera panhead 306. On the basis of this camera control command, the camera panhead 306 performs operations such as panning, tilting, and zooming.

In step S354, the CPU 300 inputs frame data taken by the camera 307 via the camera panhead 306, and stores the data in image area 1 on the memory 301.

In step S355, the CPU 300 acquires data concerning the motion of the camera 307 from the camera panhead 306. That is, the camera panhead 306 operates the camera 307 after receiving the camera control command, and data concerning the motion of the camera 307 can be acquired by monitoring the status of a motor or the like. The CPU 300 writes the acquired data in the working area on the memory 301.

In step S356, the CPU 300 compares the obtained data (the magnitude of the motion) pertaining to the motion of the camera 307 with a predetermined value.

If the magnitude of the motion is equal to or smaller than the predetermined value (NO in step S356), the flow advances to step S357, and the CPU 300 sets the number of front and back reference frames to M (in this case, 3). Then, in step S358, the CPU 300 sets m×m as the range of search for motion vectors to be used when motion compensation is performed during inter-frame coding (to be described later). In this case, m is, e.g., 32 pixels. After that, the flow advances to step S361.

If the magnitude of the motion is larger than the predetermined value (YES in step S356), the flow advances to step S359, and the CPU 300 sets the number of front and back reference frames to N (in this case, 1). In this embodiment, M>N always holds. In step S360, the CPU 300 sets n×n as the range of search for motion vectors to be used when motion compensation is performed during inter-frame coding (to be described later). In this case, n is, e.g., 55 pixels. After that, the flow advances to step S361.

In step S361, the CPU 300 determines the coding mode of frame data to be coded.

If the coding mode is intra-frame coding, the flow advances to step S362, and the CPU 300 executes intra-frame coding for the input frame data. The CPU 300 then stores the generated coded data in the code area on the memory 301, and the flow advances to step S364.

If the coding mode is inter-frame coding, the flow advances to step S363, and the CPU 300 executes inter-frame coding by executing motion compensation by searching for motion vectors within the set range, while referring to an image in an image area having the set number of reference frames. The CPU 300 then stores the generated coded data in the code area on the memory 301, and the flow advances to step S364.

In step S364, the CPU 300 stores the decoded image in an empty image area or in an image area storing the temporally oldest image data of the image areas on the memory 301. In step S365, the CPU 300 transmits the coded data stored in the code area to the communication line 310 via the communication interface 309, and the flow returns to step S352 to process the next frame.

In the fourth embodiment as described above, if the motion of the camera is large (lively), temporally separated frames are not referred to because the reference frequency of these frames extremely decreases. In this manner, the arithmetic processing amount of motion compensation can be greatly reduced. As a consequence, the processing speed can be increased.

Also, if the motion of the camera is large (lively), accurate motion vector search can be performed by making the motion vector search range wider than that when the camera motion is small. That is, when the number of reference frames is reduced from 5 to 2, the arithmetic operation amount remains the same even if the motion vector search range is extended to $(3025(55\times55))/1024(32\times32))^{1/2}$. This makes it possible to efficiently search for motion vectors without increasing the load on the CPU.

In the fourth embodiment, reference frames are three frames before a frame to be coded and three frames after it. However, it is obviously also possible to use any number of reference frames by securing a necessary amount of image areas for storing reference frames.

In the fourth embodiment, data is transmitted to the communication line 310 via the communication interface 309 by activating the communication software. However, data may also be stored in the storage device 305.

In addition, input images need not be sensed images from the camera. It is also possible to use motion image data stored in the storage device 305, and change the number of reference frames while determining the magnitude of the motion of the frame. Furthermore, the number of reference frames may also be changed if a scene change or the like is detected.

It is, of course, also possible to implement embodiments by freely combining the arrangements of the first to fourth embodiments in accordance with the applications or purposes.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-425826 filed on Dec. 22, 2003, which is hereby incorporated by reference herein.

The invention claimed is:

1. A motion image coding apparatus which codes a motion image by executing motion compensation for frame data to be coded by referring to a plurality of frame data in the motion image, comprising:
 a detecting unit that detects a motion of an imaging device;
 a plurality of storage units that stores the plurality of frame data;
 a determination unit that determines a number of reference frames to be referred when frame data to be coded is coded, wherein, in a case that motion information detected by said detecting unit is larger than a predetermined value, the number of reference frames is less than the number of reference frames in a case that motion information is equal or to smaller than the predetermined value;
 a selecting unit that selects, from said plurality of storage units, storage units where frame data is stored, according to the number of reference frames determined by said determination unit;
 an estimating unit that estimates a motion vector on the basis of frame data stored in the storage units selected by said selecting units and frame data to be coded;
 a coding unit that codes frame data to be coded by using the motion vector estimated by said estimating unit; and
 an output unit that outputs the coded data which is coded by said coding unit.

2. The motion image coding apparatus according to claim 1, wherein said detecting unit detects the motion of said imaging device on the basis of a motion image sensed by said imaging device.

3. The motion image coding apparatus according to claim 1, wherein said selecting unit comprises a control unit that controls write/read and power supply to said plurality of storage units, motion according to the number of reference frames determined by said determination unit.

4. The motion image coding apparatus according to claim 1, further comprising a setting unit that sets an image sensing mode of said imaging device,
 wherein said selecting unit comprises a control unit that controls write/read and power supply to said plurality of storage units on the basis of the image sensing mode set by said setting unit.

5. The motion image coding apparatus according to claim 3 or 4, wherein said control unit stops power supply to storage units not selected by said selecting unit.

6. The motion image coding apparatus according to claim 1, further comprising a search range control unit that controls a motion vector search range of said estimating unit on the basis of the motion image detected by said detecting unit.

7. A control method of a motion image coding apparatus which comprises a plurality of storage units for storing a plurality of frame data in a motion image, and codes the motion image by executing motion compensation for frame data to be coded by referring to frame data stored in the plurality of storage units, comprising:
 a detection step of detecting a motion of an imaging device;
 a determination step of determining a number of reference frames to be referred when frame data to be coded is coded, wherein, in a case that motion information detected by said detection step is larger than a predetermined value, the number of reference frames is less than the number of reference frames in a case that motion information is equal or to smaller than the predetermined value;
 a selection step of selecting, from the plurality of storage units, storage units where frame data is stored, according to the number of reference frames determined by said determination step;
 an estimation step of estimating a motion vector on the basis of frame data stored in the storage units selected in said selection step and frame data to be coded;
 a coding step of coding the frame data to be coded by using the motion vector estimated in said estimation step; and
 an output step of outputting the coded data which is coded in said coding step.

8. A program, stored on a non-transitory computer-readable storage medium, for implementing control of a motion image coding apparatus which comprises a plurality of storage units for storing a plurality of frame data in a motion image, and codes the motion image by executing motion compensation for frame data to be coded by referring to frame data stored in the plurality of storage units, comprising program codes of:
 a detection step of detecting a motion of an imaging device;
 a determination step of determining a number of reference frames to be referred when frame data to be coded is coded, wherein, in a case that motion information detected by said detection step is larger than a predetermined value, the number of reference frames is less than the number of reference frames in a case that motion information is equal or to smaller than the predetermined value;
 a selection step of selecting, from the plurality of storage units, storage units where frame data is stored, according to the number of reference frames determined by said determination step;
 an estimation step of estimating a motion vector on the basis of frame data stored in the storage units selected in said selection step and frame data to be coded;
 a coding step of coding the frame data to be coded by using the motion vector estimated in said estimation step; and
 an output step of outputting the coded data which is coded in said coding step.

* * * * *